Figure 1:
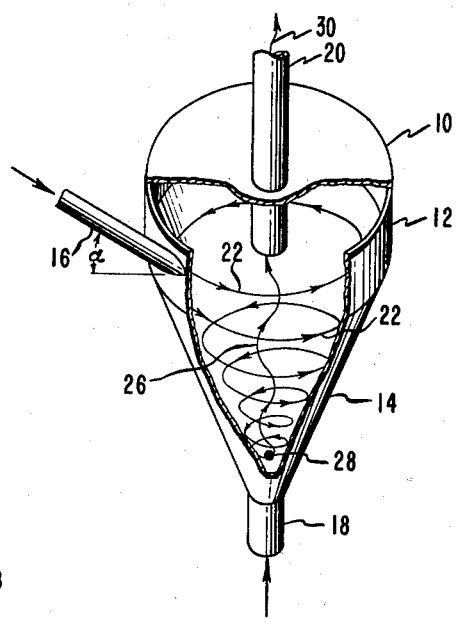

June 21, 1960 G. RUMMERT 2,942,043
PROCESS FOR CARRYING OUT ENDOTHERMIC CHEMICAL REACTIONS
Filed Dec. 23, 1955

INVENTOR
GUNTER RUMMERT

BY Connolly & Hutz

ATTORNEYS

United States Patent Office 2,942,043
Patented June 21, 1960

2,942,043

PROCESS FOR CARRYING OUT ENDOTHERMIC CHEMICAL REACTIONS

Günter Rummert, Burghausen an der Salzach, Germany, assignor to Farbwerke Hoechst Aktiengesellschaft vormals Meister Lucius & Bruning, Frankfurt am Main Hochst, Germany, a German company Filed Dec. 23, 1955, Ser. No. 555,134

Claims priority, application Germany Jan. 3, 1955

6 Claims. (Cl. 260—679)

The present invention relates to a new and useful process for carrying out endothermic chemical reactions. More particularly, the process of the present invention relates to an improved method of supplying the heat requirements of an endothermic chemical reaction.

In carrying out endothermic chemical reactions, it is possible to supply the heat necessary for the reaction either by indirect heat transfer means or directly by means of a suitable heat carrier. By heat carrier is meant a solid, liquid or gaseous substance. However, in reactions such as cracking of hydrocarbons for the purpose of producing high yields of gaseous products such as acetylene, ethylene, propylene, etc., the high heat requirements offer a number of technical difficulties. Thus, in the case of supplying the heat through the walls of the reaction vessel, economic materials of construction of the vessel will not generally withstand a temperature of the heating medium sufficiently high to obtain a temperature differential adequate for efficient operation. In addition, adequate time is required to heat the reactants to the temperature desired. This time requirement results in undesired reactions in many instances which occur below the temperature of the desired reaction.

The prior art has suggested a number of processes for shortening the time requirement for attaining the necessary reaction temperature. For example, it is common practice to burn a portion of the starting material (the degree of combustion being controlled by the quantity of oxygen supplied) in order to supply the heat needed for the desired reaction. However, this procedure has several disadvantages among which are loss of valuable raw material reactants and production of combustion products which contaminate the desired end product and require expensive purification procedures. Another procedure commonly used is to supply the heat requirements by the aid of heated ceramic pebbles which are introduced into the reaction zone, cooled by contact with the reactants, subsequently withdrawn and reheated for further introduction into the reaction zone. This procedure has the disadvantage of requiring expensive apparatus for handling the solid heat carrier.

There are two conditions that must be met in order to use a gaseous heat carrier for directly supplying the heat requirements of an endothermic reaction. First, the heat carrier fluid must be easily separated from the reaction product and secondly the heat carrier fluid must have a specific heat sufficiently high to provide the desired quantity of heat with a minimum quantity of heat carrier gas.

An object of the present invention is to provide an improved process for carrying out endothermic reactions of the type in which the heat requirements are directly supplied by a fluid heat carrier.

A further object of the present invention is to provide a process as aforesaid wherein intimate admixture of the heat carrier fluid and one or more reactants is effected in a minimum of time to obtain the necessary heat requirements of the reaction with a minimum quantity of heat carrier fluid.

A further object of the present invention is to provide a process as aforesaid wherein the heat requirements of the endothermic reaction are supplied under conditions readily permitting a variation of the time of reaction within a reaction chamber of given size.

Figure 2:
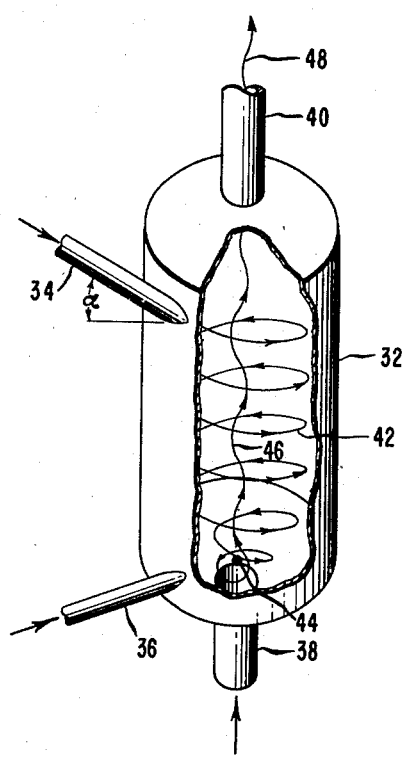

These and other objects of the present invention will become more apparent upon considering the following description thereof taken in connection with the drawing wherein:

Fig. 1 is a perspective, partially broken away, of one form of apparatus useful for the present invention; and, Fig. 2 is a view similar to Fig. 1 of a further form of apparatus useful in accordance with the process of the present invention.

In accordance with the present invention, an endothermic reaction such as hydrocarbon cracking and involving but one reactant is carried out by introducing the reactant as a stream into a confined zone of circular cross section at a point adjacent one end thereof and in a direction to progressively define a helicoidal path of the stream moving in a direction toward the other end of the zone. This path is interrupted and reversed by simultaneously introducing a fluid heat carrier stream in the direction of flow reversal and along an axis concentric with the axis of the helicoidal path to intermix the reactant and heat carrier streams and thereby effect the desired endothermic reaction while withdrawing the mixture of reaction products and heat carrier fluid along a path of extension of the path of introduction of the heat carrier stream.

As a result of the use of a helicoidal path of the reactant stream and the simultaneous mixture and transfer of heat between the reactant stream and the heat carrier stream within the confines of the helicoidal path, a number of advantages are obtained. Thus, intimate admixture of the heat carrier fluid and the reactant is effected substantially instantaneously to afford the heat requirements of the reaction in a minimum of time with the result that undesired reactions occurring at temperatures lower than that of the desired reaction are eliminated. In addition, the duration of the reaction and hence the yield of product can be easily adjusted. For example, if the weight ratios of the reactant and heat carrier streams are maintained constant, the temperature of introduction of the heat carrier stream may be raised or lowered to vary the reaction time. On the other hand, the temperature of the heat carrier stream may be maintained and the weight ratio of the two streams varied to obtain the same result.

With reference to Fig. 1 of the drawing, the reaction vessel 10 of circular cross section throughout its length, the upper portion 12 being cylindrical and the lower portion 14 being conical in shape, includes fluid reactant stream entrance conduit 16, heat fluid carrier stream entrance conduit 18 and product withdrawal conduit 20. Entrance conduit 16 introduces the single reactant, for example, a hydrocarbon mixture which is to be cracked, into reaction vessel 10 at a point adjacent one end thereof and in a direction at the point of entry substantially tangential to the cylindrical wall 12. Preferably, conduit 16 introduces the fluid reactant stream at an acute angle $\alpha$ to a plane transverse to the axis of reaction vessel 10, the magnitude of the angle $\alpha$ depending upon the velocity of the stream flowing in conduit 16, the cross sectional area of conduit 16, the cross sectional arc and length of vessel 10 and other factors which will be apparent to those skilled in the art. A preferred value for the angle α insofar as most reactions are concerned is of the order of about 15° to 45°. As a result of the method of introducing the reactant stream into the reaction vessel 10 through conduit 16 and in view of the circular cross section of reaction vessel 10, the fluid reactant stream defines a helicoidal path 22 moving in a direction toward the other end of reaction vessel 10 and following closely the wall of reaction vessel 10.

Simultaneously, a heated fluid heat carrier stream is introduced by conduit 18 in an opposite direction and along a path 26 coincident with the axis of the reaction vessel 10 of central cross section. The direction of flow of the reactant stream of helicoidal path 22 is interrupted and reversed adjacent the point of introduction 28 of the fluid heat carrier stream with a resultant intermixing and flow of the merged streams upwardly along path 26 within the confines of the helicoidal path and concentric with the axis of reaction vessel 10. Upon admixture, the heat requirements of the endothermic reaction are provided substantially instantaneously and the desired reaction is effected, with or without external aid, and the resultant mixture is withdrawn as a stream at the other end of the reaction vessel 10 along a path of extension 30 of the path of introduction 26 of the heated fluid heat carrier stream through conduit 18.

Fig. 2 of the drawing illustrates a modified form of the apparatus of Fig. 1, the form of apparatus of this figure being useful for carrying out endothermic reactions between two fluid reactants. The reaction vessel 32 is of circular cross section throughout its length, i.e., substantially cylindrical, and includes a conduit 34 for introducing a fluid stream of one of the reactants, a conduit 36 for introducing a fluid stream of the other reactant, a conduit 38 for introducing a heated fluid heat carrier stream, and a conduit 40 for withdrawing the products of the reaction including the heat carrier stream. In the case of conduit 34, the reactant stream there introduced forms a helicoidal path 42 just as described in connection with conduit 16 of Fig. 1. Simultaneously, a second fluid reactant stream is introduced by conduit 36 so as to supply the reactant of this stream at a point 44 at which the direction of flow of the reactant stream of helicoidal path 42 is interrupted and reversed while being admixed with the reactant stream of conduit 36 and the heated fluid heat carrier stream introduced by conduit 38. Upon admixture, the endothermic reaction is effected, with or without external aid, and the resultant products including the heat carrier fluid are withdrawn as a stream at the other end of the reaction vessel 32 along a path of extension 48 of the path of introduction 46 of the fluid heat carrier stream.

As will be apparent from the above description of various examples of apparatus suitable for the process of the present invention, it is essential that one of the reactants be introduced as a stream into a confined zone of circular cross section at a point preferably adjacent one end thereof and in a direction to progressively define a helicoidal path of the stream moving in a direction toward the other end of the zone and that this path of flow be interrupted and reversed by the introduction of a heat carrier stream at the other end of the zone in an opposite direction so as to obtain admixture and reaction within the helicoidal path. One or more additional reactants may be introduced in any desired manner so long as each such reactant merges and admixes with the reactant of the helicoidal path and the heated heat carrier stream at the point of interruption and reversal of flow. With the foregoing in mind, other variations of the specifically described apparatus will be apparent.

It will be further understood by those skilled in the art that although the reaction vessels of Figs. 1 and 2 are vertically arranged, they may be arranged horizontally or at an angle to the vertical. It will be further understood that in the event the nature of the reaction is such that a catalyst is required, provision for its presence may be accomplished by suspending the catalyst adjacent the point of admixture and reaction by the use of a netting or other suitable catalyst support or by fluid entrainment of the catalyst in a reactant or heated heat carrier stream. In the case of the latter means of introducing the catalyst or in the event that one or more of the streams entering the reaction vessel include a solid material entrained therein, the catalyst or other solid material will be removed from the reaction mass as in a conventional cyclone separator and can therefore be recovered by withdrawal from the bottom of the reaction vessel.

The foregoing description of this invention is for the purpose of illustration only and is not limiting to the scope thereof which is set forth in the claims.

I claim:

1. A process for supplying the heat requirements to an endothermic chemical reaction which comprises the steps of introducing a fluid reactant as a stream into a confined zone of circular cross section and having a substantially vertical axis at a point adjacent one end thereof and in a direction to progressively define a helicoidal path of said stream moving in a direction toward the other end of the zone, introducing a heated reaction inert fluid stream at the other end of the zone in an opposite direction and along a path coincident with the axis of said zone of circular cross section, the direction of flow of the reactant stream being interrupted and reversed adjacent the point of introduction of the heat carrier stream with a resultant intermixing, effecting the endothermic chemical reaction, and withdrawing resultant product and heat carrier stream adjacent the one end of the zone and along a path coincident with the path of introduction of the heat carrier stream.

2. The process of claim 1 wherein another fluid reactant is introduced as a stream into the confined zone of circular cross section in a direction effecting intermixing with the first reactant and heated heat carrier stream at the point of interruption and reversal of the path of the first fluid reactant stream.

3. The process of claim 2 wherein a catalyst for said reaction is entrained in one of said streams.

4. The process of claim 1 wherein the reactant stream is introduced into the reaction zone substantially tangentially at the point of introduction and in a direction to define an angle α to a plane transverse to the axis of the reaction zone, said angle α being from about 15° to 45°.

5. The process of claim 1 wherein the weight ratio of the reactant stream flow per unit of time to the heated heat carrier stream flow per unit of time and the temperature of the heated heat carrier stream are adjusted to determine the temperature of reaction.

6. A process for cracking hydrocarbons which comprises the steps of introducing a fluid reactant as a stream into a confined zone of circular cross section and having a substantially vertical axis at a point adjacent one end thereof and in a direction to progressively define a helicoidal path of said stream moving in a direction toward the other end of the zone, introducing a heated reaction inert, fluid stream at the other end of the zone in an opposite direction and along a path coincident with the axis of said zone of circular cross section, the direction of flow of the reactant stream being interrupted and reversed adjacent the point of introduction of the heat carrier stream with a resultant intermixing, effecting the endothermic chemical reaction, and withdrawing resultant product and heat carrier stream adjacent the one end of the zone and along a path coincident with the path of introduction of the heat carrier stream.

References Cited in the file of this patent

UNITED STATES PATENTS

| | | |
|---|---|---|
| 366,118 | Lambotte | July 5, 1887 |
| 669,750 | Jones | Mar. 12, 1901 |
| 729,008 | Sutton et al. | May 26, 1903 |

(References on following page)

UNITED STATES PATENTS

| | | |
|---|---|---|
| 729,009 | Sutton et al. | May 26, 1903 |
| 901,232 | Eldred | Oct. 13, 1908 |
| 1,213,887 | Krause | Jan. 30, 1917 |
| 1,629,200 | Buhtz | May 17, 1927 |
| 2,441,613 | Balassa | May 18, 1948 |
| 2,656,254 | Heller | Oct. 20, 1953 |
| 2,675,295 | Daniels | Apr. 13, 1954 |
| 2,763,699 | Van Dijk | Sept. 18, 1956 |

FOREIGN PATENTS

| | | |
|---|---|---|
| 607,162 | Great Britain | Aug. 26, 1948 |
| 656,569 | Great Britain | Aug. 29, 1951 |